Oct. 28, 1969 KATSUO MAKINO ET AL 3,475,552

SIGNAL DISTRIBUTING SYSTEM

Filed May 31, 1966

INVENTORS

KATSUO MAKINO

IWAO SAWATO

BY Sughrue, Rothwell, Mion, Zinn & Macpeak

ATTORNEYS 3,475,552
SIGNAL DISTRIBUTING SYSTEM
Katsuo Makino and Iwao Sawato, Odawara-shi, Kanagawa, Japan, assignors to Fuji Shashin Film Kabushiki Kaisha, Ashigara-Kamigum, Kanagawa, Japan
Filed May 31, 1966, Ser. No. 553,750
Claims priority, application Japan, May 29, 1965, 40/31,327
Int. Cl. H04n 3/08
U.S. Cl. 178—7.6 4 Claims

ABSTRACT OF THE DISCLOSURE

A signal distributing system in which a light beam modulated by an electric signal is projected on a rotatable reflecting mirror and the reflected light beam successively scans a plurality of photoconductive elements arranged around the rotatable mirror in coaxial relation with the axis of rotation of the mirror. The resistance of each photoconductive element is varied in accordance with the intensity of the projected light beam. Electric current signals or volt signals varying in accordance with the modulated light beam can be obtained in each circuit containing the photoconductive element.

This invention relates generally to an improved electric signal distributing system and more particularly to an electric signal distributing system for the apparatus to reproduce or record image signals as visible images.

Present image reproducing or recording apparatus, such as high image quality, high velocity facsimile receivers and plate-like television receivers using an electro-luminescent substance wherein high velocity electric signals, such as electric facsimilie signals and television image signals are recorded and reproduced pictorially as visible images, are not entirely satisfactory unless a proper electronic allotter is provided for the cathode-ray tube television receiver.

It is required for the electric transmission of images to reduce two dimensional elements to one dimensional by scanning, but an excellent photoelectric converting system has been developed as a means for converting images into one dimensional electric signal, that is, a retransmitter, whereby images can be converted into good electric image signals at a high velocity and transmitted. An enormous transmission system is required for increasing the scan density and raising the transmission image quality, but since a transmitter station is a permanent installation, cost is no restriction.

On the receiving end, on the contrary, a system for reproducing or recording high quality images at a high velocity is restricted by the cost. The cathode-ray tube system is most excellent for reproducing television image signals but it has such disadvantages that it is very difficult to enlarge the image screen and to project the reproduced images on the screen. Further, in a wall-type flat-screen television receiver using an electro-luminescent substance, there are no excellent distributing systems for signals except a mechanical system which is not very practicable.

The foregoing is concerned with the conversion of electric image signals to visible images which are transitory and may immediately disappear. When it is desired diretcly to record image signals, however, the recording material is consumed so that cost spent therefor should be considered from a commercial point of view. It is possible for receiving and recording television image signals to combine a light-sensitive material or electrically sensitive material with a cathode-ray tube, for example, electrically sensitive material with a cathode-ray tube having a fluorescent layer surface, and a light-sensitive material with a cathode-ray tube having an electric conductive narrow wire buried surface. When a cathode-ray tube is used, electric signals or optical signals are distributed on the surface thereof and are transmitted to a recording material; therefore, the cathode-ray tube must be connected with the recording material mechanically or optically, thereby resulting in a practical problem due to the spatial restriction.

The present invention provides an improved high velocity distributing system to replace the cathode-ray tube distributor and the mechanical allotter, whereby the reproduction or recording of high quality images can be economically effected at a high velocity. The improved signal distributing system is particularly useful for making practicable the use of electro-luminescent plate-like television receivers for receiving and recording image signals of television of facsimile transmission by parallel scanning, whereby the high velocity recording is favourably performed.

While the prior art signal distributing apparatus are hampered practically by various restrictions in respect of velocity and life due to their mechanical systems, the distributing system of the invention, being free from mechanical contacts or abrasions, makes possible a higher speed distribution as compared with the known mechanical systems.

In accordance with the invention, there is provided an electric signal distributing system comprising converting electric signals into optical or light intensity signals corresponding thereto, projecting the light signals in a form of beam on a revolving reflecting mirror, then projecting the reflected light on photoconductive elements arranged around the mirror in a circle coaxial with the axis of rotation of the mirror, causing a resistance change in each photoconductive element in accordance with the intensity strength of the reflected light beam and thereby producing voltages or electric currents varying with the initial electric signals in the electric circuit including the photoconductive elements.

The invention is further illustrated by the accompanying drawings wherein.

Figures 1, 2, 3:
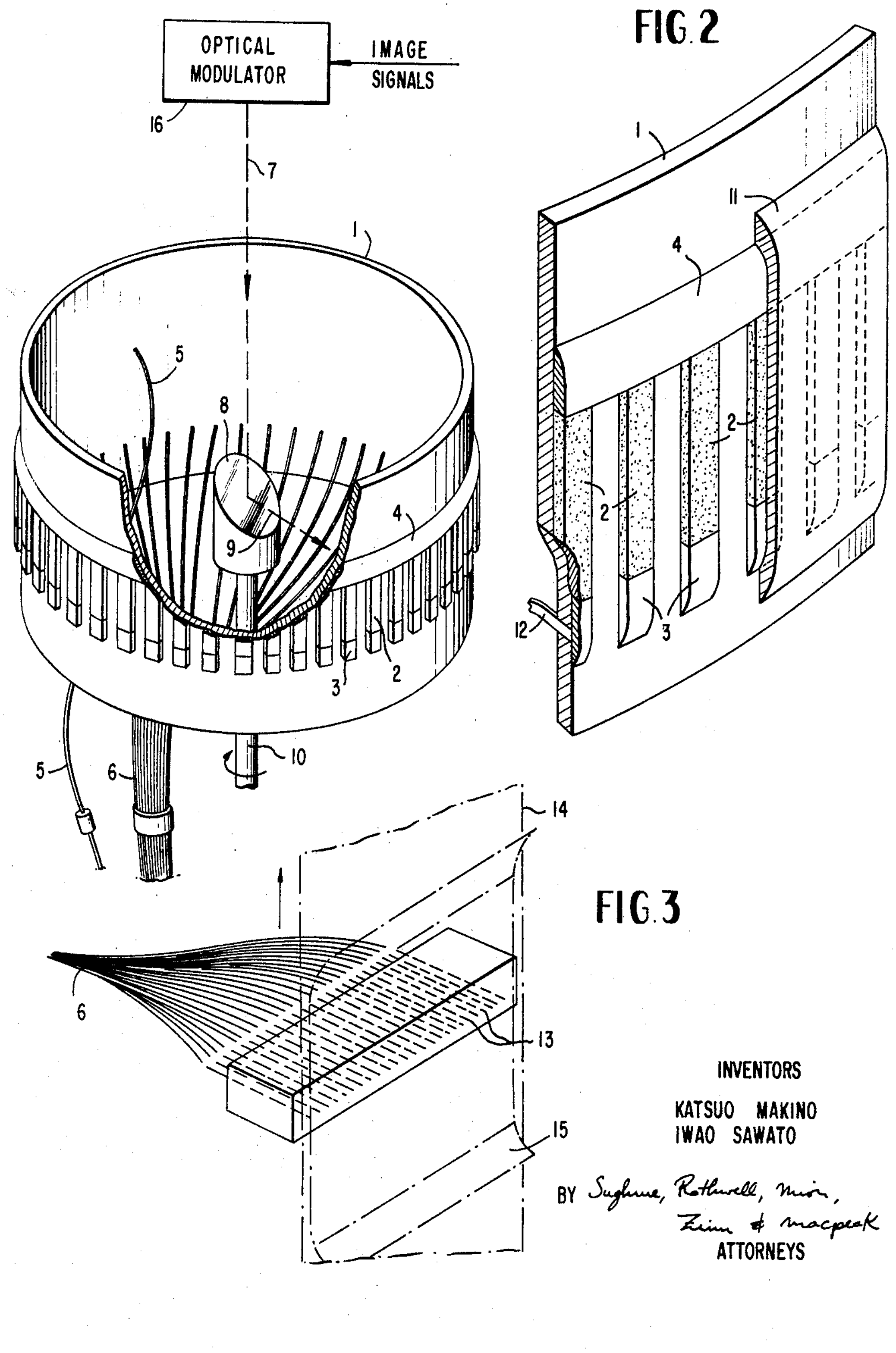
FIG. 1 is a cut away perspective view of one preferred embodiment of the signal distributing system by our invention.
FIG. 2 is an enlarged perspective view with a cut away section of the high resistance photoconductive elements and electrodes in the signal distributing device of FIG. 1.
FIG. 3 shows an electrostatic recording system for use in combination with the signal distributing system of FIG. 1 for the reception of facsimile transmission.

In FIG. 1 there is shown a plurality of high resistance photoconductive elements 2, insulated from each other, and arranged circumferentially on the outside of a cylindrical support 1. The cylinder is transparent to visible light in the preferred embodiment. However, any type of radiation, such as infra-red, ultra-violet, X-ray, etc., may be used. The cylinder is made transparent to the radiation used. Electrodes 3 and 4 are connected to the opposite ends of each high resistance photoconductive element. The electrodes 3 are insulated from each other, but the electrode 4 may be formed as one conductor common to all the photoconductive elements. Electrode 4 consists of a band circling 1, and photoconductive elements 2 project from the band in a form of comb. The electrodes 3 are connected to the other ends of the photoconductive elements 2. The band electrode 4 is connected to a lead wire 5, and the electrodes 3 are each connected to individual lead wires 6.

A light beam 7, whose intensity is modulated by a suitable means 16 in response to electric image signals, is projected on a rotating reflecting mirror 8, so that the reflecetd light beam 9 impinges successively upon the high resistance photoconductive elements 2 on cylinder 1. Mirror 8 is mounted on a rotatable shaft 10. When the reflected light beam 9 successively impinges upon photoconductive elements 2, the resistance of each photoconductive element 2 is changed in accordance with the intensity of the light falling upon it. Therefore, when a high voltage is applied to electrode 4 through lead wire 5, electric current signals or voltage signals varying in accordance with the light intensity of beam 7 are distributed on photoconductive elements 2 and appear on the corresponding lead wires 6. In the case of distributing a horizontal scan of 500 image segments, for example, an integer times 500 of high resistance photoconductive elements and electrodes are arranged on the cylinder, and the reflecting mirror is rotated at such a speed that the time of one revolution is an integer times the time required for the horizontal scan.

In FIG. 1, a cylindrical support 1 is used, but a disk may also be used. The photoconductive elements are arranged around the circumference of the disk, and the axis of an intensity modulated light beam is so adjusted as to be coaxial with the central axis of the disk. Wether a support is to be transparent or opaque to the light beam is determined by the position of the reflecting mirror which may direct light to either side of the disk or cylinder support. In any case, the support must have a high insulating property.

The arrangement of the electrodes 3, 4 and photoconductive elements 2, illustrated in FIGS. 1 and 2, belongs to a surface resistance type device, but it will be understood that a sandwich type may be employed, in which an electrically conductive continuous film is formed on a support so that it may be used as an electrode corresponding to the electrode 4 of FIG. 2, high resistance photoconductive elements independent each other are formed on the film and electrodes corresponding to the electrodes 3 of FIG. 2 are formed thereon. In employing this sandwich type, the electrode at the side receiving the light beam should be made of a material somewhat transparent to light. The electrodes are formed by vapor deposition of metal in vacuo or by application of electrically conductive paint.

It is required for the high resistance photoconductive element to exhibit a suitably high resistance in the case of no radiation. Although a relation of the resistance in a dark place and the change of resistance with the intensity of light must be suitably accomplished for use in our distributing system, these can be relatively easily controlled by the geometrical structure and characteristics of a photoconductive material itself. As the photoconductive material, antimony trisulfide, cadmium sulfide, lead sulfide or amorphous selenium is used, and the photoconductive elements and electrodes are coated with an electrically insulating film 11 for moisture proofing and mechanical protection. The light beam, whose intensity is modulated in accordance with electric signals, can be obtained by an ordinary light modulator 16.

The electric signals distributed by our distributing apparatus are introduced into an image reproducing apparatus or image recording apparatus as shown in FIG. 3. For example, electric signals are applied to the X-axis and Y-axis of an electroluminescent body having an electrode structure arranged in a matrix by the use of two distributing apparatus, thereby reproducing television images. In some cases, electric signals are applied to narrow pins 13 insulated electrically from each other and drawn up in one or more lines by way of our distributing apparatus, and images are formed on a recording paper 14 in accordance with the electric signals, the recording paper running in contact with the narrow pins or facing them through a clearance. The recording paper is electric current color forming paper, such as carbon paper forming color electrochemically, electric sensitive recording paper and insulating recording paper capable of recording visible images by imparting electric charges to the recording paper or withdrawing electric charges therefrom in accordance with electric signals and then developing this by means of an electostatic detecting powder. In recording, an electrode 15, provided at the one end of the recording paper 14 or at the back thereof, is to be connected with a high voltage power source supplying voltage to the lead wire 5 of FIG. 1.

What is claimed is:

1. An electric signal distributing system comprising:
   (a) a rotatable reflecting mirror,
   (b) an optical modulator means for projecting an intensity modulated light beam,
   (c) a plurality of photoconductive elements arranged around said mirror in a circle coaxial with the axis of rotation of said mirror, whereby the photoconductive elements are successively scanned by the modulated light beam as the light beam reflects from the rotating mirror,
   (d) electrode means connected to the opposite end of each photoconductive element, one of the electrodes comprising a single conductor common to the corresponding ends of all the photoconductive elements, the other of the electrode means comprising a plurality of individual electrodes, each of which is attached to one of the photoconductive elements and is insulated from each other, and
   (e) individual signal output means connected to each of the individual electrodes.

2. An electric signal distributing system as defined in claim 1, wherein said optical modulator means modulates the intensity of the light beam by means of input electric image signals derived from scanning an image, thereby producing on said output means electric signals corresponding to said input image signals.

3. An electric signal distributing system as defined in claim 2 further comprising means for rotating said mirror in synchronism with the scanning rate of said input image signals.

4. An electric signal distributing system as defined in claim 1 further comprising a facsimile recording device, a plurality of electric signal inputs mounted on said device and connected to corresponding ones of said individual output means.

References Cited

UNITED STATES PATENTS

| | | | |
|---|---|---|---|
| 1,966,354 | 7/1934 | Noxon | 178—7.6 |
| 3,363,103 | 1/1968 | Fowler et al. | 250—199 |
| 3,050,580 | 8/1962 | Schwertz. | |

RALPH D. BLAKESLEE, Primary Examiner

B. LEIBOWITZ, Assistant Examiner

U.S. Cl. X.R.

178—6.6; 250—220; 350—285